(12) United States Patent
Herder et al.

(10) Patent No.: US 7,839,900 B1
(45) Date of Patent: Nov. 23, 2010

(54) METHOD AND ARCHITECTURE FOR TTNT SYMBOL RATE SCALING MODES

(75) Inventors: John C. Herder, Cedar Rapids, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1090 days.

(21) Appl. No.: 11/541,483

(22) Filed: Sep. 29, 2006

(51) Int. Cl.
H04J 3/22 (2006.01)
(52) U.S. Cl. ..................................... 370/545
(58) Field of Classification Search ................. 370/545
See application file for complete search history.

(56) References Cited

U.S. PATENT DOCUMENTS

| | | | |
|---|---|---|---|
| 4,383,323 A | 5/1983 | Timor | |
| 4,688,251 A | 8/1987 | Citron et al. | |
| 5,422,952 A | 6/1995 | Kennedy et al. | |
| 5,625,641 A | 4/1997 | Takakusaki | |
| 5,715,236 A | 2/1998 | Gilhousen et al. | |
| 5,757,767 A | 5/1998 | Zehavi | |
| 5,781,582 A | 7/1998 | Sage et al. | |
| 5,832,026 A | 11/1998 | Li | |
| 5,914,933 A | 6/1999 | Cimini et al. | |
| 5,930,244 A | 7/1999 | Ariyoshi et al. | |
| 5,943,361 A | 8/1999 | Gilhousen et al. | |
| 6,049,535 A | 4/2000 | Ozukturk et al. | |
| 6,088,337 A | 7/2000 | Eastmond et al. | |
| 6,169,761 B1 | 1/2001 | Marcoccia et al. | |
| 6,246,698 B1 | 6/2001 | Kumar | |
| 6,320,896 B1 | 11/2001 | Jovanovich et al. | |
| 6,498,820 B1 | 12/2002 | Thomson et al. | |
| 6,519,262 B1 | 2/2003 | Stephens et al. | |
| 6,522,650 B1 | 2/2003 | Yonge et al. | |
| 6,658,063 B1 | 12/2003 | Mizoguchi et al. | |
| 6,671,331 B1 | 12/2003 | Sakuma | |
| 6,686,829 B1 | 2/2004 | Hohberger et al. | |
| 6,721,331 B1 | 4/2004 | Agrawal et al. | |
| 6,836,469 B1 | 12/2004 | Wu | |
| 6,904,282 B2 | 6/2005 | Cooper | |
| 6,917,606 B2 | 7/2005 | Sashihara | |
| 7,088,734 B2 | 8/2006 | Newberg et al. | |
| 7,142,521 B2 | 11/2006 | Haugli et al. | |
| 7,292,617 B2 | 11/2007 | Beasley et al. | |
| 2002/0009067 A1 | 1/2002 | Sachs et al. | |
| 2002/0191643 A1* | 12/2002 | Yun et al. | 370/474 |
| 2003/0012217 A1 | 1/2003 | Andersson et al. | |
| 2003/0053469 A1 | 3/2003 | Wentink | |
| 2003/0067963 A1* | 4/2003 | Miller et al. | 375/130 |

(Continued)

*Primary Examiner*—Donald L Mills
*Assistant Examiner*—Sai-Ming Chan
(74) *Attorney, Agent, or Firm*—Matthew J. Evans; Daniel N. Barbieri

(57) ABSTRACT

An architecture for a frequency hopped spread-spectrum transmitter-receiver in an advanced tactical data link packet switched network that ensures optimal Statistical Priority-based Media Access (SPMA) performance, enables more efficient packing of hop channels in a given allocated bandwidth and counteracts hostile jamming. The transmitter-receiver supports a scalable symbol rate mode that reduces the symbol rate in the time domain and decreases the bandwidth in the frequency domain, over a predetermined prior value. A transceiver according to the present architecture is able to statically or dynamically scale the symbol rate of transmissions, operate in burst mode and change the hop set. In one embodiment the transceiver is part of a Software Defined Radio (SDR).

11 Claims, 3 Drawing Sheets

U.S. PATENT DOCUMENTS

| | | |
|---|---|---|
| 2004/0203460 A1 | 10/2004 | Hasegawa |
| 2005/0013386 A1 | 1/2005 | Ojard |
| 2005/0030914 A1 | 2/2005 | Binzel et al. |
| 2005/0201315 A1* | 9/2005 | Lakkis ........................ 370/315 |
| 2005/0242990 A1 | 11/2005 | Lawrence et al. |
| 2005/0254560 A1 | 11/2005 | Huang |
| 2006/0018391 A1 | 1/2006 | Cho et al. |
| 2007/0030116 A1* | 2/2007 | Feher ........................ 340/5.53 |

* cited by examiner

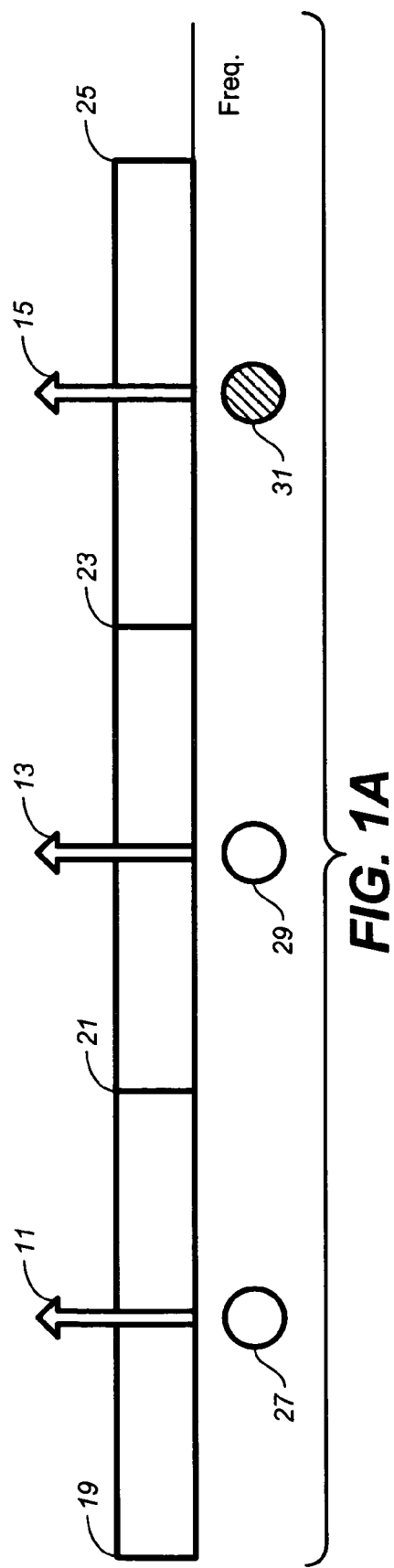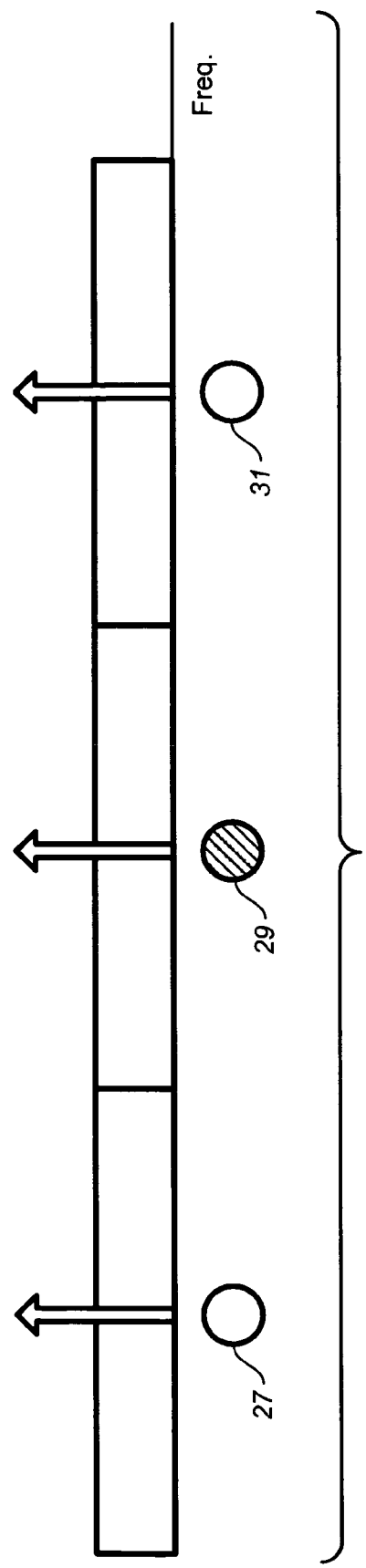

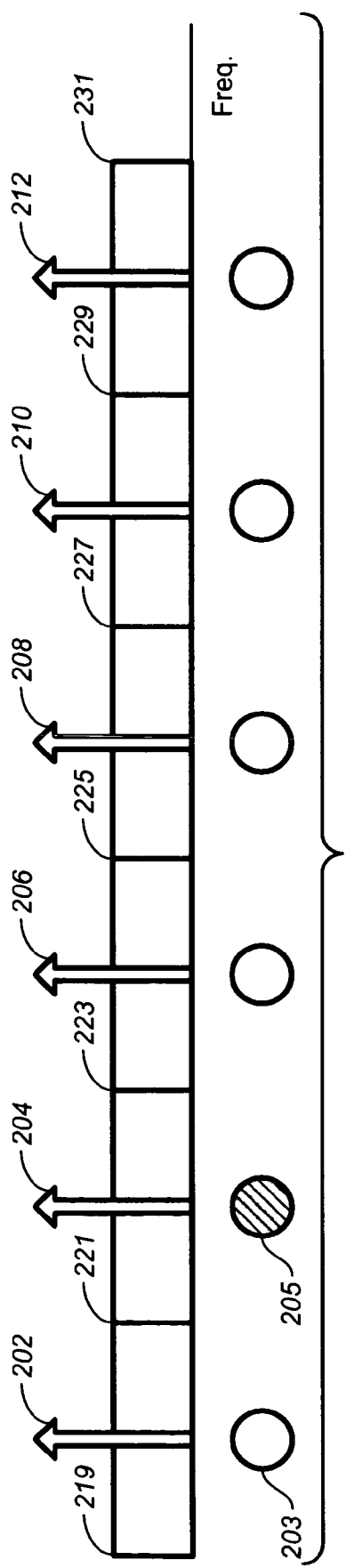
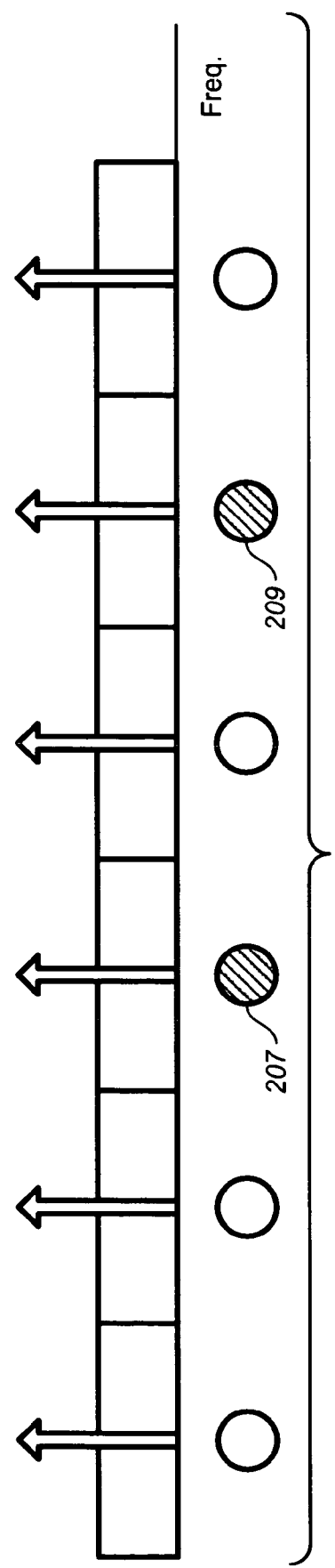
FIG. 2A
FIG. 2B

METHOD AND ARCHITECTURE FOR TTNT SYMBOL RATE SCALING MODES

CROSS-REFERENCE TO RELATED APPLICATIONS

None

BACKGROUND OF THE INVENTION

1. Field of Invention

The present invention relates generally to the field of command, control, communications, computer, intelligence surveillance, and reconnaissance (C4ISR) hardware and software systems and components, as well as commercial wireless applications and in particular using spread-spectrum communications.

2. Description of Related Art

TTNT (Tactical Targeting Networking Technology) is an advanced tactical data link (TDL) currently under development by Rockwell Collins Government Systems and the Advanced Technology Center. TTNT is an Internet Protocol (IP) based, high-speed, dynamic ad hoc network designed to enable the U.S. military to quickly target moving and time-critical targets. TTNT meets several requirements including transmitting 2 Mbps of data over 100 nautical miles with a latency of less than 2 milliseconds for high priority traffic; 10 Mbps network capacity; Link 16 compatibility; five-second ingress; high Doppler performance and multi-node, beyond-line-of-sight routing. TTNT is intended to support more than 200 users for secure, jam-resistant transmissions at high speed Internet throughputs, and to allow reception of four or more receive streams simultaneously.

In the present invention, certain terms are used, as appreciated by a skilled artisan. Thus "chip" is often defined as "channel bit". A spread spectrum system, such as used by the present invention, achieves its spectral spreading using one or more techniques such as direct sequence, forward error correction, orthogonal channel coding and frequency hopping. Regardless of the technique used, the bits produced by the spreading are often referred to as "chips". These chips are modulated and sent over the channel. This distinguishes the bits created by the spreading technique ("chips") from the information bits going into the spreading technique ("bits"). Note that spread spectrum chips are not required to be binary. "Chip rate" is the rate or frequency at which the chips are transmitted. In a spread spectrum system, the chip rate is much faster than the information bit rate, thus the spectral spreading. "Chip time" is the reciprocal of the chip rate, or the duration in time of a single chip. "Multiple chip times" refers to a period of time that is equal to more than one chip time. A "known sequence" is a sequence of chips (or bits, or symbols) of which an authorized receiver has prior knowledge. The known sequence is typically sent at the beginning of a transmission. The receiver performs a search for the known sequence in order to detect the presence of a desired signal and synchronize its signal processing to it. The process of detecting the presence of a desired signal is often referred to as the signal "acquisition".

Transmission of a digital signal using continuous bandpass limited signals is also done using any combination of modulation of amplitude, frequency or phase of the sinusoidal carrier wave. The modulating waveform may consist of rectangular pulses, and the modulated parameters, which can be termed symbols, can be switched or keyed from one discrete value to another, using binary or M-ary amplitude-shift keying (ASK), frequency-shift keying (FSK), phase-shift keying (PSK), and the like.

The present invention may be employed in software defined radio (SDR), which employs waveform modulation and demodulation schemes of the kind used in radio data transmission but on a software driven platform, including but not limited to Frequency Modulation (FM), Amplitude Modulation (AM), Single Side Band (SSB), Double Side Band (DSB), Vestigial Sideband (VSB), Frequency Shift Keying (FSK), Phase Shift Keying (PSK), Gaussian Minimum Shift Keying (GMSK), Quadrature Amplitude Modulation (QAM), Frequency Hopped Spread Spectrum (FHSS), Direct Sequence Spread Spectrum (DSSS), Orthogonal Frequency Division Multiplexing (OFDM) and the like.

Software defined radio (SDR) creates radios that function like computers, where the functionality of a radio is defined by software that can be upgraded, rather than by fixed hardware. SDR has been defined as a radio whose signal processing functionality is defined in software; where the waveforms are generated as sampled digital signals, converted from digital to analog via a high speed Digital-to-Analog Converter (DAC) and then translated to Radio Frequency (RF) for wireless propagation to a receiver. The receiver typically employs an RF subsystem coupled to a high speed Analog to Digital Converter (ADC) that can capture some or all of the channels of the software radio node. The receiver then extracts and demodulates the channel waveform using software executing on a digital processor.

SDR is aimed at solving several of the challenges of over-the-air communications, including compatibility with pre-existing legacy radio systems, ability to emulate transmission and reception of a plurality of different waveforms or forms of modulation (modem control), and more efficient spectrum usage, including operation in different frequency bands, with the lowest possibility of interception, detection and interference from unauthorized parties. One of the first SDRs was the SPEAKeasy SDR, known per se in the art. The GNU Software Radio project (www.gnu.org/software/gnuradio/gnuradio.html) is another well documented SDR initiative.

The US military through the Department of Defense (DoD) has driven the development of next generation SDR with an Open Standard Architecture standard for implementing Joint Tactical Radio Systems (JTRS), which is used to communicate in military communication systems, through the use of an open standard Software Communications Architecture (SCA). The SCA calls out the following features: a Common Open Architecture; the ability to support multiple domains, including airborne, fixed, maritime, vehicular, dismounted and handheld applications; the ability to operate in multiple frequency bands; compatibility with legacy radio systems; the easy ability to upgrade new technologies to improve performance; enhanced security, including cryptographic capability, user identification and authentication, encryption key management, and multiple independent levels of security classification; networking ability, including support for legacy network protocols; software reusability; and support for plug-and-play and real-time reconfigurability, with waveforms being portable from one implementation to another.

SUMMARY OF THE INVENTION

The architecture for the present invention is advantageous for combating jamming and for more efficient use of existing TINT (Tactical Targeting Networking Technology) networks.

The present invention enables implementation of a Common Tactical Weapon Data-Link waveform that can be unified with TINT networking.

The present invention may be employed in software defined radio (SDR).

The present invention enables TINT Signal In Space to be more scalable to fit within limited quantized bandwidth allocations. Signal in Space is a label for all the attributes of the RF signaling used in a Software-Defined Radio waveform. Examples include modulation method, pulse data format and pulse characteristics, error detection coding, and more. Further, the architecture and method of the present invention reallocates energy to better defeat hostile jamming of the TDL.

The present invention can be used as an implementation of a Common Tactical Weapon Data-Link waveform that can be unified with TINT networking. Presently, TINT has a fixed number of frequency channels of a designated bandwidth. These channels can be programmed into the hop pattern, excised on a long-term theater-wide basis, or temporarily excised. Some of the bands intended for use by TINT may be shared with other radio services. Due to channel widths and fixed assignments shared, bands may have leftover empty spots where neither shared service has a center frequency. Thus TINT can be readily used to implement the present invention.

The present invention employs, in hardware and/or software module, a Symbol Rate Scaling mode that uses Statistical Priority-based Media Access (SPMA) in a spread-spectrum transmitter/receiver system that scales the symbol data rate of the TINT waveform(s). A Symbol Rate Scaling mode in such a spread-spectrum system achieve the following objectives: 1) it further increases the difficulty of hostile jamming by concentrating transmit power into adjustable, scalable channel bandwidths; 2) it enables more efficient packing of hop channels into a given allocated bandwidth; and, 3) it ensures optimal SPMA performance in narrower hop spaces through maintaining a reasonable number of hopping frequencies. SPMA stands for Statistical Priority-based Media Access, which is a patented technique used on TINT that permits randomized asynchronous transmissions among network participants while optimizing network throughput. Further information on SPMA may be gleamed from commonly assigned, co-pending United States Patent Application, entitled "Waveform For Virtually Simultaneous Transmission And Multiple Receptions System And Method", naming inventors Zogg et al., Ser. No. 10/217,731, filed Aug. 13, 2002, Publication no. 20040032878, published Feb. 19, 2004, incorporated by reference herein.

The present invention can be implemented by scaling the symbol data rate of the TTNT waveform. For existing implementations, the rates may be scaled by factors of ½, ¼, ⅛ and possibly 1/16. Other scaling factors are also possible and do not have to be a power of 2.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

FIGS. 1(A and B) is an example of the frequency domain of a signal network that the present invention improves upon.

FIGS. 2 (A and B) is an example of the frequency domain of a signal network after application of the present invention.

Figure 3:
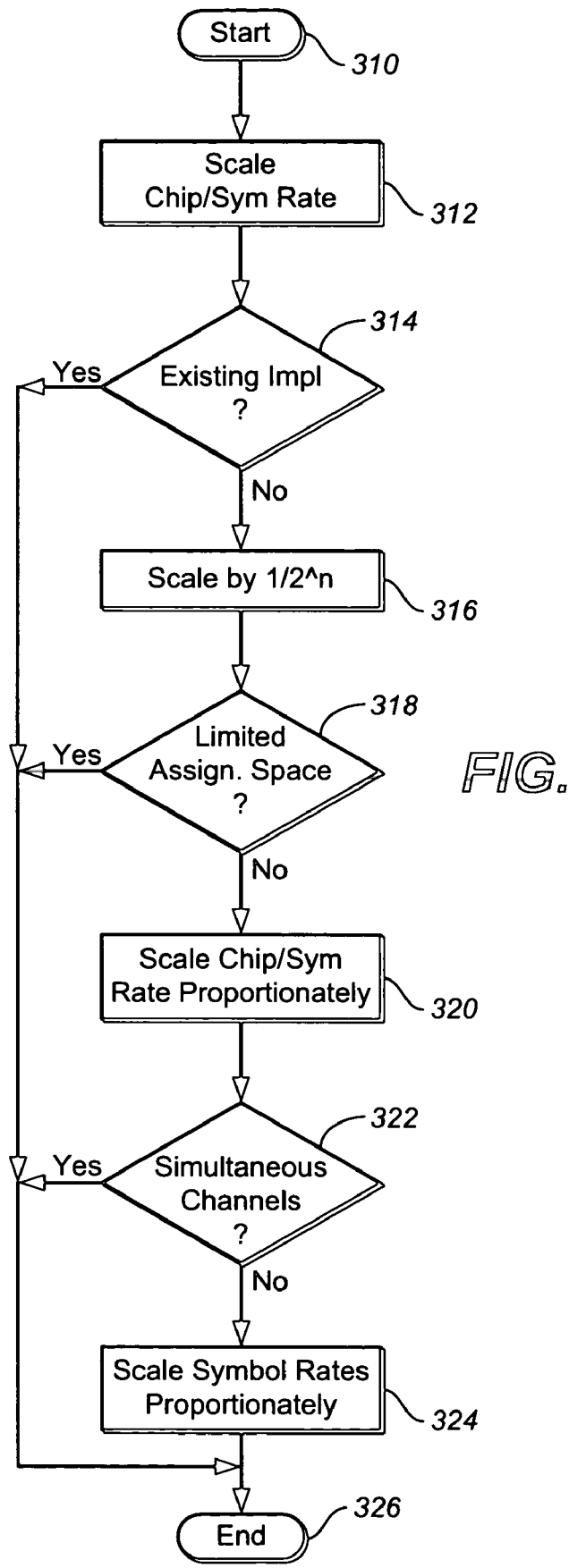
FIG. 3 is an example of a flowchart for implementing the methodology of the present invention.

It should be understood that one skilled in the art may, using the teachings of the present invention, vary embodiments shown in the drawings without departing from the spirit of the invention herein.

DETAILED DESCRIPTION OF THE INVENTION

The method and apparatus of the present invention may be hardware—such as a spread-spectrum receiver—that is hardwire programmed to perform the functions outlined herein (e.g., an ASIC), hardware running firmware, or hardware running software, with the software existing in memory, and which may be written in any computer language (such as C, C++, Perl, Java or the like), and the further, and/or in the alternative, the software may be run by a computer system having an operating system. The computer system typically has one or more processors, primary and secondary memory cooperating with the processor(s), which executes instructions stored in the memory, I/O means such as monitor, mouse and keyboard, and any necessary specialized hardware or firmware. Depending on the language used to construct and implement the software, the source code, object code and/or executables of the software may have any number of classes, functions, objects, variables, templates, lines of code, portions of code and constructs (collectively and generally, "a process step", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program. In addition, the binary executable or source code data comprising the software of the present invention may reside on computer readable storage medium (e.g., a magnetic disk, which may be portable); memory (e.g., flash RAM); DVD or CD-ROM.

Turning attention to FIGS. 1 (A) and (B), there is shown a waveform diagram in the frequency domain of a present TINT (Tactical Targeting Networking Technology) network spectrum. The present invention employs, in a hardware and/or software module, with the software module in a software defined radio (SDR), a Symbol Rate Scaling mode in a spread-spectrum transmitter/receiver system that scales the symbol data rate of the TINT waveform(s). TINT waveforms may be any form of modulating waveform, such as analog, with typically a sinusoidal carrier wave, or digital, such as a pulse train (comprised of many sinusoidal waves), and having modulating parameters, such as modulation of amplitude, frequency and/or phase, which carry the information in the waveform. TINT waveforms are typically spread spectrum waveforms, that may be modulated by Frequency hopping (FHSS), direct-sequence spread spectrum (DSSS), PN spreading (using PN Sequences), time scrambling, chirp, and combinations of these techniques. TINT waveforms may be modulated with the modulating parameters, termed symbols or symbol modulating parameters, that may be keyed from one discrete value to another, including but not limited to binary or M-ary amplitude-shift keying (ASK), frequency-shift keying (FSK), phase-shift keying (PSK), and the like. TINT presently has a fixed number of frequency channels, each of a designated bandwidth. This is shown in FIG. 1 (A and B) as phasors (in the time domain), each having line spectra 11, 13, 15, each centered in a bandwidth, e.g. bandwidth frequencies 19 to 21 for line spectra 11; frequencies 21 to 23 for line spectra 13; frequencies 23 to 25 for line spectra 15. Though phasors indicating simple sinusoidal waveforms in the time domain are illustrated for conceptual purposes, in general throughout this invention any arbitrary waveform may be employed. Further, the bandwidths need not be of equal size or equal width as shown in the drawings. Further, the bandwidths can be non-contiguous, or, alternatively, even overlapping by some amount.

When spread-spectrum modulation and transmission is employed, these bandwidths form channels that can be programmed into a frequency hop pattern. This is shown conceptually in FIG. 1 with dots, such as dots 27, 29, 31, beneath each bandwidth, that are either solid or hollow to indicate that the bandwidths are active transmitting and receiving signals or inactive, respectively. FIGS. 1(a) and 1(b) represent snapshots of the frequency spectrum at different points of time. By changing which frequency or set of frequencies are active at any given time, as shown by comparing FIG. 1(b) with FIG. 1(a), e.g. bandwidth 29 is active in FIG. 1(b) but not in FIG. 1(a), where bandwidth 31 is active, a signal can be spread over a wider spectrum, and the channel bits thus transmitted can become part of a network that readily adopts new members, is capable of superior encryption, and which results in other benefits particular to spread spectrum systems as is appreciated by those skilled in the art.

When spread spectrum systems employ a plurality of different transmitting and receiving nodes, the nodes may have bandwidths that are not used. These bandwidths may be excised on a long-term theater-wide (network-wide) basis, or temporarily excised (temporarily delete a frequency from the spread spectrum hop pattern). Some of the bandwidths intended for use by a TTNT may be shared with other radio services. Due to channel widths and fixed assignments shared bands may have leftover empty spots where neither shared service uses a center frequency. Note the present invention is used in both a transmitter and a receiver, and in the general case may be used in a transceiver (a transmitter and receiver of analog or digital signals), including a satellite transponder or network adapter. The present invention is preferably used in a packet-switching network of nodes, but is not limited to just packet switching but also other protocols, such as full and fractional T-1 wireless circuits for example, so that wireless transmissions get mapped into a T-1 frame rather than a packet.

Turning attention to FIG. 2, there is shown the architecture for the present invention in terms of the effect on the bandwidth as shown in the frequency domain. The present invention employs, in hardware and/or software, a Symbol Rate Scaling mode in a spread-spectrum transmitter/receiver system, employing an M-ary modulated symbol in a CW modulation transmission, that scales the symbol data rate of the TTNT waveform(s) from an preexisting, predetermined original symbol data rate.

The present invention employs, in hardware and/or software in a transmitter or receiver (herein, referring to a transmitter and/or receiver, individually and collectively, as a transceiver), a Symbol Rate Scaling mode module in a spread-spectrum transceiver system that scales the symbol data rate of the TINT waveform(s). A Symbol Rate Scaling mode in such a spread-spectrum system achieve the following objectives: 1) it further increases the difficulty of hostile jamming by concentrating transmit power into adjustable, scalable channel bandwidths; 2) it enables more efficient packing of hop channels into a given allocated bandwidth; and, 3) it ensure optimal SPMA performance in narrower hop spaces through maintaining a reasonable number of hopping frequencies. This feature can be implemented by scaling the symbol data rate of the TTNT waveform. For existing implementations, the data rates may be scaled by factors of ½, ¼, ⅛ and possibly ⅟₁₆, that is, a multiple of one over the power of two. Other scaling factors to reduce the symbol data rate are also possible, and do not have to be a power of two in the denominator as above, but can be any scaling factor ALPHA ($\alpha$) less than one. For the signal received by the transceiver, the present invention uses SPMA for channel access, and the signals are transmitted by randomized asynchronous transmissions with the SPMA protocol.

The present invention uses SPMA for channel access of transceivers. SPMA improves Aloha media access by splitting the normal, single burst Aloha transmission into a number of smaller bursts. Aloha is a type of TDMA transmission system used for satellite and terrestrial radio links. The smaller bursts are spread out pseudo-randomly over time and frequency. Error correction coding is applied, so that not all of the smaller bursts must be received correctly in order to correctly receive the information contained in the overall transmission. SPMA can handle correlated events. If several users transmit at the same time, there is still sufficient randomization occurring, because the overall transmission is broken up into the multiplicity of sub-transmissions, so that enough of the sub-transmissions will get through to permit reconstruction of the overall transmission from several users at the same time.

SPMA uses an error correcting code with especially good "erasure" properties. In coding theory an erasure is an area of the received transmission which is known from knowledge not derived from the receiver itself to be corrupted. Thus, the "erased" portion of the received transmission can receive zero weight as the received transmission is reconstructed by the error correcting decoder. A portion of a message known to be erased is much less damaging than a portion of a message with random errors. A property of radio transmitters is that they block out nearby receivers on the same frequency, or even nearby frequencies because of unavoidable spurious emissions. SPMA takes advantage of the erasure property of the code to permit a transmitter to receive transmissions while transmitting because there are sufficient gaps in the SPMA sub-transmissions that "simultaneous" reception of several similar transmissions can occur.

Further information on SPMA may be gleamed from commonly assigned, co-pending United States Patent Application, entitled "Waveform For Virtually Simultaneous Transmission And Multiple Receptions System And Method", naming inventors Zogg et al., Ser. No. 10/217,731, filed Aug. 13, 2002, Publication no. 20040032878, published Feb. 19, 2004, incorporated by reference herein.

In the present invention, if a jammer were geared to deliver interference of a given bandwidth, the symbol rate would be scaled to ensure that the ratio of jamming energy to signal energy, or "J/S", was always favorable to the TINT node.

In the present invention, if a theater had a fixed assignment space which only allowed ¼ of the available TINT hop frequencies, packet collision performance can be improved by scaling down the symbol rate and therefore doubling or quadrupling or otherwise increasing the hop set.

In the present invention it should even be possible to use a variety of channel sizes at the same time, adapting the symbol rate to the particular channel that a TINT burst is being transmitted on at a given time, i.e., bursts on wide channels may use full symbol rate while bursts on narrower channels may have to use a smaller symbol rate.

FIG. 2 thus shows a plurality of phasors that have been scaled in their bandwidth, relative to FIG. 1, by a factor of 1/N, where in this case N=2 (i.e., ½). The symbol date rate periods have been doubled in the time domain (i.e., the symbol data rate, in frequency, F, is reduced, so the periods T increase, as F=1/T), and the bandwidths in the frequency domain have been reduced, in accordance with the well-known per se Fourier Transform formula for scale change: $v(kt) \leftrightarrow 1/|k|V(f/k)$. That is, a compression of a signal in one domain results in an expansion of the signal in the other domain, and vice versa. For continuous signals, if $V(f)$ is the Fourier Transform of $v(t)$, then $1/k \times V(f/k)$ is the Fourier Transform of $v(kt)$, where k is the parameter controlling the expansion or contraction.

FIG. 2 shows phasor line spectra of the phasors (in the time domain), each having line spectra 202, 204, 206, 208, 210, 212 (in the frequency domain), with the line spectra centered about a bandwidth of a fixed width, e.g. the bandwidth for phasor line spectra 202 delimited by frequencies 221 and 212; for line spectra 204 by frequencies 223 and 221; for spectra 206 by frequencies 225 and 223; for spectra 208 by frequencies 227 and 225; for spectra 210 by frequencies 229, 227; for spectra 212 by frequencies 231, 229.

Assuming in FIG. 2 the symbol data rate has been halved in the time domain from the FIG. 1 symbol data rates (i.e. a less frequent rate so the time period is greater), the bandwidths in FIG. 2 in the frequency domain will be reduced compared to FIG. 1. Conceptually this is shown as a bandwidth half as wide, though the actual bandwidth reduction will vary according to the Fourier Transform scale change formula. Thus phasor line spectra 202, 204, 206, 208, 210, 212, are each centered in a bandwidth that is half as wide as the bandwidth allotted the phasor line spectra of FIG. 1, e.g., the bandwidth 19 to 21 for phasor line spectra 11 in FIG. 1 is wider than the bandwidth 219 to 221 for the same phasor line spectra 202 in FIG. 2, since the symbol data rate has been halved in FIG. 2 versus the rate in FIG. 1. As before in the figures, though phasors are shown in the frequency domain, which implies a sinusoidal waveform in the time domain, in general any type of waveform may be employed.

The waveforms of the present invention employ the same type of spread-spectrum modulation of frequency hopping as before, as indicated by the solid and hollow dots. Thus bandwidth 205 in FIG. 2 is active in one point in time while at another point in time bandwidths 207 and 209 are active, which conceptually shows frequency hopping that produces spectral spreading.

Turning attention now to FIG. 3 there is shown a flowchart for the method of carrying out the present invention. Though the flowchart is shown as procedural, flowing from top to bottom, in practice program flow can be more object oriented, displayed in the Unified Modeling Language (UML) style, with events driven by messages and suitable countdown timers to drive processes through message requests. Further, where the present invention is instantiated in software, such as a SDR, the software modules that perform the various functions defined herein may be part of the Symbol Rate Scaling mode module or residing in a different module, with no loss of generality.

The present invention contemplates both real time scaling of the symbol rate scaling, i.e. dynamic scaling, as well as scaling upon initialization of the present invention, or built into the architecture of the present invention, that does not change over time upon initialization, i.e. static scaling. Real-time scaling is the ultimate implementation, and requires a means of discovering or distributing knowledge of unused bandwidth segments in a network at every point in time. However, real-time scaling is more difficult to implement. Therefore, in a preferred embodiment, scaling upon initialization or initial configuration, that is, static scaling, is a useful stepping stone for a first generation implementation of the present invention.

In step 310 in FIG. 3 the present invention starts and makes any suitable initializations, such as determining what the bandwidth of the network employing the present invention is, and what scaling factor to use, and proceeds to step 312, labeled "Scale chip/symbol rate", where the symbol data rate for one or more channels in frequency-hopped spread-spectrum communications transmitters in a network of transmitters and receivers employing a packet switching system is scaled down, as described herein. In step 314, labeled "Existing Impl.", the program checks to see if there is an existing implementation, in which case, as indicated in step 316, labeled "Scale by ½^n", the rates are scaled by factors of ½, ¼, ⅛, and possibly 1/16, or in general ½^n, where n=an integer. However, in the general case the scaling factor may be any arbitrary number, and does not have to be an integer power of 2.

The scaling factor in steps 312 and 316 may be selected to ensure that if a jammer were geared to deliver interference of a given bandwidth, the symbol rate would be scaled to ensure that J/S (Jamming-to-Signal power ratio) was below the threshold of interference to the TINT node.

In step 318, labeled "Limited Assign. Space ?", the program checks to see if the theatre that the network comprising the present invention operates in has a spectrum assignment space that is less than the normal spectrum allocations. In a limited assignment space, only for example one-fourth of the available TINT hop frequencies would be allowed. Packet collision performance can be improved by scaling down the symbol rate and therefore doubling or quadrupling the hop set, which is done in step 320, labeled "Scale Chip/Sym Rate Proportionately". Symbol rate and hop set are generally inversely proportional to one another. When multiple nodes are competing for transmit opportunities, the rate of successful packet receptions per packet transmission attempt is improved when the hop set is increased. Greater hop set sizes reduce the likelihood of collision for two given pulses transmitted at the same time.

If no fixed assignment space exists, or after step 320, the program checks in step 322, labeled "Simultaneous Channels ?", for the existence of simultaneous channels. If the present invention is used in a network simultaneously employing a plurality of communication channels of varying bandwidth, the symbol rate can be adapted to a particular channel to optimize a particular TTNT burst. TINT networks often work in a burst mode, which is a high-speed transmission mode in a communications channel where under certain conditions, the system sends a burst of data at higher speed for a limited amount of time. For example, a multiplexor channel may suspend transmitting several streams of data each over their own bandwidth and send one high-speed transmission using the entire bandwidth of the streams; essentially assuming one is starting at a fractional symbol rate and wants to aggregate the band segments. If simultaneous channels are detected, in step 324, labeled "Scale Symbol Rates Proportionately", the wide channels may use full symbol rates, while bursts on narrower channels use a smaller symbol rate, effectively varying the symbol rate according to the size of the channel. In step 326, the program terminates.

Although the present invention has been described in terms of the preferred embodiments above, numerous modifications and/or additions to the above-described preferred embodiments would be readily apparent to one skilled in the art. Thus while the present invention employs systems related to military, other applications are possible as well, such as support for a bursty sensor system with a large number of users. It is intended that the scope of the present invention extends to all such modifications and/or additions and that the scope of the present invention is limited solely by the claims set forth below.

We claim:

1. An improved spread-spectrum transceiver comprising:
a transceiver configured to transmit a signal comprising a modulated waveform having symbol modulating parameters and a symbol data rate;
the transceiver having a symbol rate scaling mode module configured to change the symbol data rate from a preexisting symbol data rate;
the transceiver further configured to transmit a modulated waveform that is a spread-spectrum signal;
the transceiver further configured to operate with a plurality of frequency channels to communicate with a plurality of other transceivers, each of the channels in the transceiver having a preexisting symbol data rate of a designated frequency bandwidth; and
the symbol rate scaling mode module in the transceiver further configured to reduce the symbol data rate from the preexisting symbol data rate by a scaling factor less than one, and reduce the designated frequency bandwidth for at least one the channels to a smaller frequency bandwidth, wherein
the scaling factor is a multiple of one over the power of two,
the symbol rate scaling mode module is software in a Software Defined Radio (SDR) and the spread spectrum signal transmitted by the transceiver is a frequency hopped spread spectrum signal,
the transmission is a randomized asynchronous transmission,
the plurality of other transceivers, each operating a plurality of channels, comprises a plurality of nodes in a network, the nodes communicating with one another in a packet switching network,
the other transceivers in the plurality of nodes having a software module to increase the hop set, the software module configured to improve the rate of successful packet receptions per packet transmission attempt and reducing the likelihood of collision for two given packets transmitted at the same time, and the software module further configured to transmit in a burst mode, and upon detection of simultaneous channels in the plurality of channels, to vary the symbol rate according to the size of the channel, and
wherein the transceiver symbol rate scaling mode module is configured to dynamically reduce the symbol data rate at any point in time, in real-time, wherein the channel access of said channels is SPMA.

2. An improved spread-spectrum transceiver comprising:
a transceiver configured to transmit a signal comprising a modulated waveform having symbol modulating parameters and a symbol data rate;
the transceiver having a symbol rate scaling mode module configured to change the symbol data rate from a preexisting symbol data rate;
the transceiver further configured to transmit a modulated waveform that is a spread-spectrum signal;
the transceiver further configured to operate with a plurality of frequency channels to communicate with a plurality of other transceivers, each of the channels in the transceiver having a preexisting symbol data rate of a designated frequency bandwidth; and
the symbol rate scaling mode module in the transceiver further configured to reduce the symbol data rate from the preexisting symbol data rate by a scaling factor less than one, and configured to reduce the designated frequency bandwidth for at least one the channels to a smaller frequency bandwidth; wherein,
the plurality of other transceivers, each operating a plurality of channels, comprise a plurality of nodes in a network, the nodes communicating with one another in a packet switching network;
the spread spectrum signal transmitted by the transceiver is a frequency hopped spread spectrum signal, wherein the channel access of said channels is SPMA; and
the transceiver is further configured to transmit in a burst mode, and upon detection of simultaneous channels in the plurality of channels, to vary the symbol rate according to the size of the channel.

3. The invention according to claim 2, wherein:
the waveform is a TTNT waveform and the plurality of nodes are TTNT nodes, and the transceiver Jamming-to-Signal power ratio is set by each network transceiver transmitting in burst mode to be below the threshold of interference to the TTNT node from a jamming source.

4. The invention according to claim 2, wherein:
the transceiver symbol rate scaling mode of each transceiver dynamically reduces the symbol data rate at any point in time, in real-time.

5. A method for an improved spread spectrum transceiver network communication comprising the steps of:
transmitting a modulated waveform having symbol modulating parameters and a symbol data rate;
reducing the symbol data rate of the modulated waveform from a preexisting symbol data rate to a lower symbol data rate;
providing a plurality of transceivers in a packet switching network, each transceiver transmitting the modulated waveform that is a spread-spectrum signal;
operating each transceiver over a plurality of frequency channels to communicate with the plurality of other transceivers, each of the channels in the transceiver having a preexisting symbol data rate of a designated frequency bandwidth;

reducing the symbol data rate from the preexisting symbol data rate by a scaling factor less than one, and reducing the designated frequency bandwidth for at least one of the channels to a smaller frequency bandwidth; and setting the transceiver Jamming-to-Signal power ratio in each network transceiver that is transmitting in burst mode to be below the threshold of interference to a TTNT node from a jamming source, and wherein the waveform is a TTNT waveform and the plurality of nodes are TTNT nodes.

6. The method according to claim 5, further comprising the steps of:

setting the scaling factor as a multiple of one over the power of two, and wherein said symbol rate scaling is done by software in a Software Defined Radio (SDR);

transmitting the spread spectrum signal by the transceivers as a frequency hopped spread spectrum signal;

transmitting said spread-spectrum signal according to randomized asynchronous transmissions, said randomized asynchronous transmissions comprising Statistical Priority-based Media Access (SPMA).

7. The method according to claim 6, further comprising the steps of:

provide a plurality of transceivers, each operating a plurality of channels, comprising a plurality of nodes in a network, the nodes communicating with one another in a packet switching network;

increasing the hop set using the transceiver in the plurality of nodes, thereby improving the rate of successful packet receptions per packet transmission attempt and reducing the likelihood of collision for two given packets transmitted at the same time.

8. The method according to claim 7, further comprising the steps of:

detecting simultaneous channels in the plurality of channels, and, varying the symbol rate according to the size of the channel upon detection of simultaneous channels in the plurality of channels.

9. The method according to claim 5, further comprising the steps of:

scaling said symbol rate scaling using software in a Software Defined Radio (SDR);

transmitting the spread spectrum signal by the transceivers as a frequency hopped spread spectrum signal;

dynamically reducing the symbol data rate at any point in time, in real-time.

10. The method according to claim 5, further comprising the steps of:

providing a plurality of transceivers, each operating a plurality of channels, comprising a plurality of nodes in a network, the nodes communicating with one another in a packet switching network;

transmitting the spread spectrum signal transmitted by the transceivers in a frequency hopped spread spectrum signal; and transmitting with each of the transceivers in a burst mode, and, upon detection of simultaneous channels in the plurality of channels, varying the symbol rate according to the size of the channel.

11. The method according to claim 5, further comprising the step of:

dynamically reducing the symbol data rate at any point in time, in real time.

\* \* \* \* \*